United States Patent [19]

Edwards

[11] Patent Number: 4,656,886
[45] Date of Patent: Apr. 14, 1987

[54] SHIFT MECHANISM

[75] Inventor: Douglas F. Edwards, Mt. Vernon, Ohio

[73] Assignee: The J. B. Foote Foundry Co., Fredericktown, Ohio

[21] Appl. No.: 869,812

[22] Filed: Jul. 24, 1986

Related U.S. Application Data

[63] Continuation of Ser. No. 706,662, Feb. 28, 1985, abandoned.

[51] Int. Cl.$^4$ .......................... F16H 3/08; B60K 20/00
[52] U.S. Cl. .................................. 74/475; 74/473 R; 74/371
[58] Field of Search .............. 74/371, 372, 475, 473 R

[56] References Cited

U.S. PATENT DOCUMENTS

| | | | |
|---|---|---|---|
| 734,837 | 7/1903 | Edgar | 74/371 |
| 3,812,735 | 5/1974 | Von Kaler et al. | 74/371 |

FOREIGN PATENT DOCUMENTS

| | | | |
|---|---|---|---|
| 193255 | 1/1957 | Austria | 74/475 |
| 817651 | 8/1959 | United Kingdom | 74/475 |

Primary Examiner—Leslie Braun
Assistant Examiner—Dirk Wright
Attorney, Agent, or Firm—Allen D. Gutchess, Jr.

[57] ABSTRACT

Shift mechanism is provided for shifting gears in a gearbox. The gearbox has a housing, a gear shaft in the housing, a plurality of gears rotatably mounted on the shaft, a connecting member moveable along the shaft for individually connecting the gears to the shaft, and a collar positioned around the shaft and engageable with the connecting member to move it along the shaft. The shaft mechanism includes a shifter fork for moving the collar and the connecting member along the shaft, the fork having a shift shaft pivotally mounted in the housing transversely to the gear shaft. This shaft has a first arm affixed thereto and extending on one side of the collar, with the arm having a projection on an end portion engaging a first portion of the collar. The shifter fork also has a detent plate affixed to the shift shaft and extending on the other side of the collar, with the plate having a second projection engaging a second portion of the collar generally diametrically opposite the first portion thereon. The detent plate has a plurality of detent recesses on the side of the plate opposite the second projection to receive detents. Considerably less space is thus required along the shaft than when a separate shifter fork and separate, spaced detent plate were employed, as heretofore. The simplified shift mechanism also reduces costs since separate shifter fork arms and detent plates are not employed.

7 Claims, 6 Drawing Figures

SHIFT MECHANISM

This application is a continuation of my copending application Ser. No. 706,662, filed Feb. 28, 1985 now abandoned.

This invention relates to shift mechanism for shifting gears in a gear box or the like.

This shift mechanism is employed with gear boxes in the nature of transmissions or transaxles which are used with small vehicles, including riding lawnmowers, garden tractors, golf carts, snowmobiles, snowblowers, and the like. The gear box has a housing, a gear shaft rotatably mounted in the housing, a plurality of gears rotatably mounted on the shaft, and a connecting member moveable along the shaft for individually connecting the gears to the shaft. The connecting member can be a shift key located in a longitudinal groove in the shaft and having a lug extending upwardly to engage recesses in the individual gears to mechanically connect the gears to the shaft to rotate therewith. The shift key has a projection at the end opposite the lug which is engaged by a collar positioned around the shaft.

A shifter fork in accordance with the invention is employed for moving the collar and the shift key along the shaft to individually engage the gears and also a reverse sprocket, if employed. The shifter fork includes a shift shaft which is pivotally mounted in the housing and positioned transversely to the gear shaft, on one side thereof. The shift shaft has a first arm affixed thereto and extending on one side of the collar. The arm has means for engaging a first portion of the collar, with this means usually being in the form of a projection extending into an annular groove around the collar. The shifter fork also has a detent plate affixed to the shift shaft and extending on the other side of the collar, opposite the arm. The plate has means for engaging a second portion of the collar generally diametrically opposite the first portion, with this means also usually being in the form of a second projection engaging the annular groove in the collar.

The detent plate has a plurality of detent recesses on the side thereof opposite the second projection. The detent recesses receive detents located in the top of the gear box housing and being urged downwardly, generally parallel to the shift shaft. The detent plate thus serves a double function as a detent plate and shifter fork arm and considerably less space is thus required than when a separate shifter fork and separate detent plate were employed, as has been done heretofore. The simplified shift mechanism also reduces costs by eliminating an additional shifter fork arm component.

The detent plate can have the detent recesses arranged in two arcuate rows of different radii but having a common center. The detent recesses are staggered and those in each row are engaged by one of two spring-loaded detents mounted in the top of the gear box housing. This arrangement enables the various shift positions of the gear box to be accomplished through a relatively short arcuate movement of the shift shaft, particularly where there are a relatively large number of detent positions. Such may occur, for example, in a five speed transaxle which has five forward speed gears, a neutral position, and a reverse sprocket, each requiring engagement of a detent in a detent recess of the plate.

The detent plate can also have a relatively large opening, preferably positioned between the inner arcuate row of detent recesses and the shift shaft, and positioned so that a ball of a neutral switch projects into the opening when the shift mechanism is in the neutral position. The neutral switch can then close and enable the engine to be started only when in neutral, the switch being open when the switch ball is not engaged in the opening but is riding on the surface of the detent plate.

It is therefore, a principal object of the invention to provide a simplified shift mechanism for a gear box in the nature of a transmission, transaxle, or the like.

Another object of the invention is to provide a shift mechanism for a gear box in which a detent plate and shift arm are combined as one piece.

Yet another object of the invention is to provide shift mechanism with a detent plate having multiple arcuate rows of detent recesses.

Various other objects and advantages of the invention will be apparent from the following detailed description of a preferred embodiment thereof, reference being made to the accompanying drawings, in which.

Figure 1:
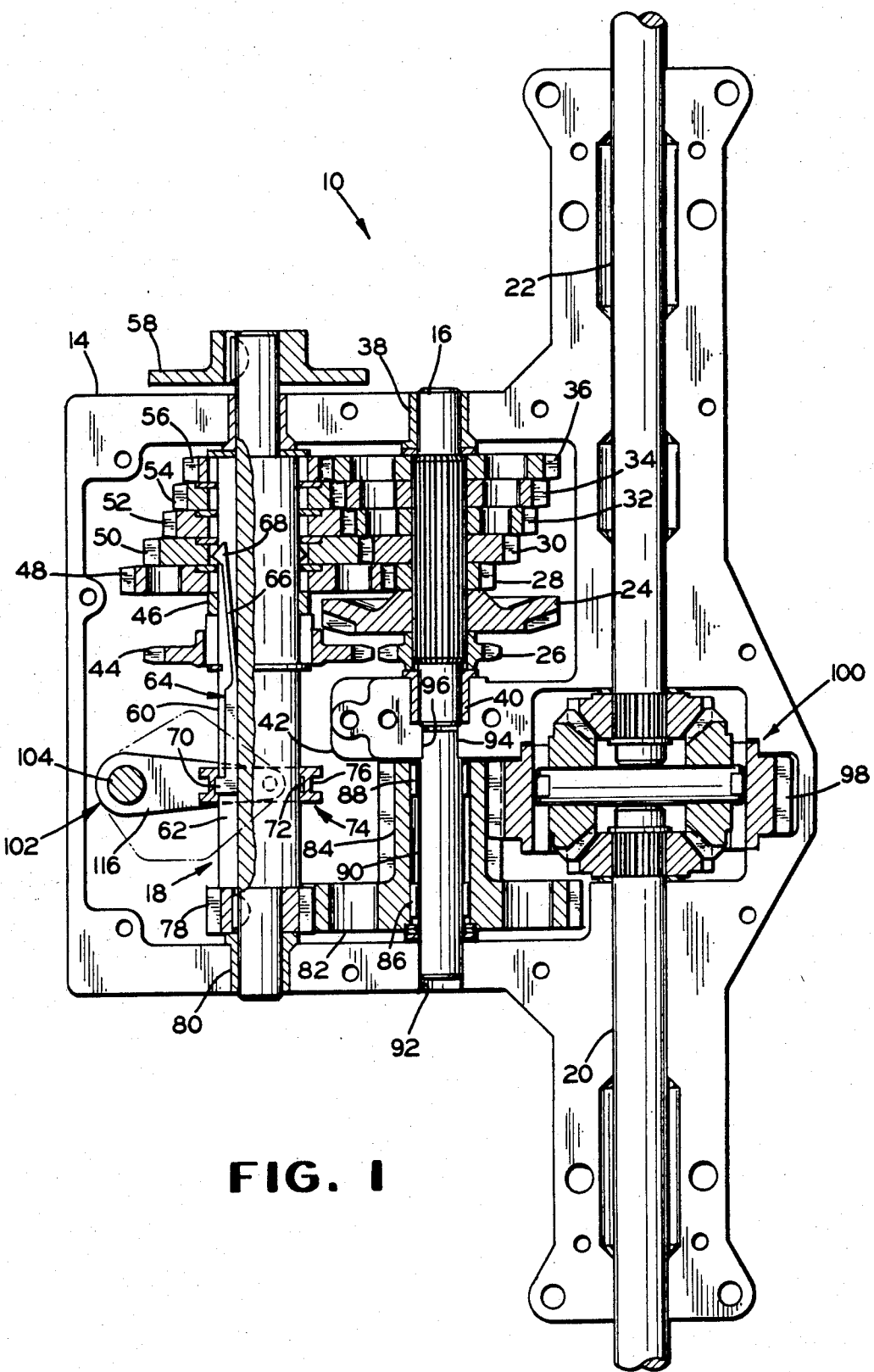
FIG. 1 is a somewhat schematic top view of a transaxle embodying the invention, with an upper housing part removed.
Figure 2:
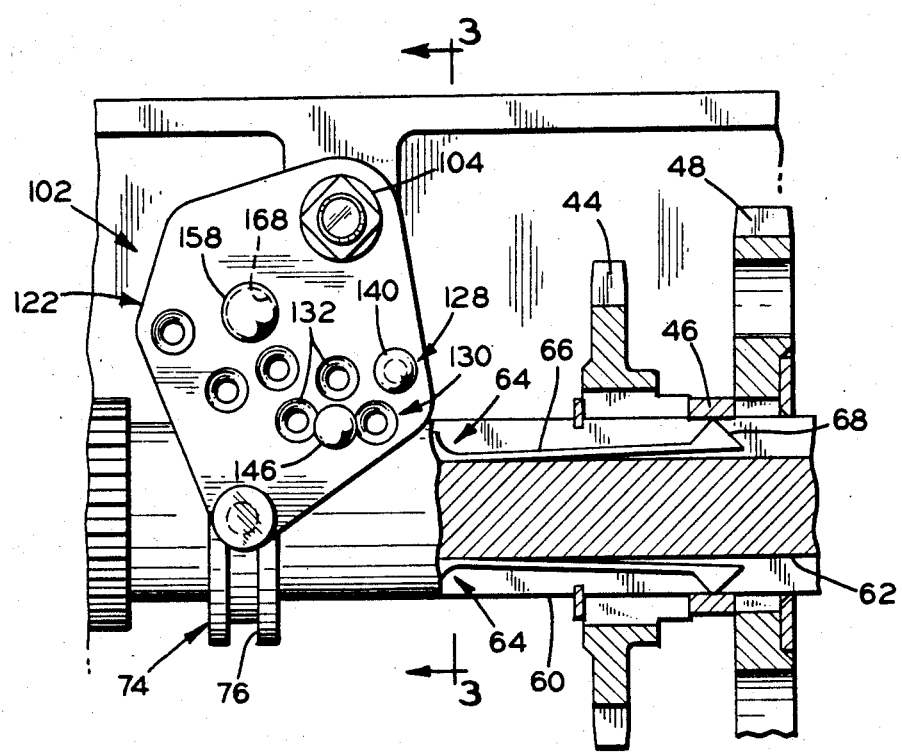
FIG. 2 is a fragmentary top view, with parts broken away and with parts in section, of the transaxle shown in FIG. 1 with a detent plate shown in a different position and in solid lines.

Referring particularly to FIGS. 1 and 2, a transaxle with which the shift mechanism according to the invention can be employed is indicated at 10. The transaxle includes an upper housing part 12 and a lower housing part 14. The transaxle has a middle, input shaft 16, an intermediate gear shaft 18, and rear output shafts or axles 20 and 22. A driven bevel gear 24 is affixed to the input shaft 16 and can be driven by a drive bevel gear (not shown) mounted on a vertical drive shaft and having an outer drive pulley above the housing part 12, with the pulley being driven through a belt by an engine mounted forwardly on a vehicle, as is well known in the art.

A reverse sprocket or toothed member 26 is affixed to the shaft 16 on one side of the driven bevel gear 24 and five forward speed gears or toothed members 28, 30, 32, 34, and 36, are affixed to the input shaft 16 on the other side of the driven bevel gear 24. The input shaft 16 is rotatably held by a bushing 38 located in the side walls of the housing parts 12 and 14 and by a bushing 40 held by intermediate supports 42 formed in the upper and lower housing parts.

A driven reverse sprocket or toothed member 44 is rotatably mounted on the gear shaft 18 on one side of a neutral spacing ring or collar 46 and is connected to the sprocket 26 by a chain (not shown). Five driven forward speed gears or toothed members 48, 50, 52, 54, and 56 are rotatably mounted on the shaft 18 on the other side of the neutral collar 46. A brake disc 58 is affixed to the shaft 18 externally of the transmission.

An enlarged portion 60 of the gear shaft 18 has two longitudinally extending grooves 62 therein, being diametrically opposed. A draw or shift key 64, which constitutes a connecting member, is located in each of the grooves 62 for longitudinal movement and includes a resilient shank 66 having a lug 68 at one end. A projection 70 on the other end of the draw key 64 is received in an inner annular groove 72 of a shift collar 74 having an outer annular groove 76. When the draw key 64 is moved longitudinally, the lug 68 selectively engages recesses in the toothed members 44 and 48-56 to individually connect them with the shaft 18 so as to rotate therewith. When the lug 68 of the draw key 64 is under the neutral collar 46, none of the toothed members is engaged with the shaft.

When one of the toothed members is engaged with the gear shaft 18, the shaft rotates accordingly and rotates a drive pinion gear 78 keyed to a small end 80 of the shaft 18. The pinion gear 78 then drives a large spur gear 82 which is structurally integral with a smaller spur gear 84. These gears are rotatably mounted by needle bearings 86 and 88 on a stationary axle 90. The axle 90 has an outer end located in recesses 92 of the housing parts 12 and 14 and has an inner end with flats 94 located in recesses 96 of the intermediate supports 42. The gear 84 then drives a ring gear 98 of a differential 100 which can be of the type shown in U.S. Pat. No. 4,232,569, issued Nov. 11, 1980, and will not be discussed in detail. The output shafts or axles 20 and 22 are then driven, being connected to driven wheels of a vehicle, for example.

A shifter member or fork 102 according to the invention is employed to move the collar 74 along the enlarged portion 60 of the gear shaft 18. The shifter fork 102 includes a pivotable shift shaft 104 (FIGS. 3 and 4) having a lower end 106 rotatably received in a recess 108 in the lower housing part 14. An upper portion of the shaft 104 extends through an opening 110 (FIG. 5) in the upper housing part 12 and terminates in a non-circular end portion 112 and a threaded shank 114. A suitable crank arm (not shown) can be affixed to the non-circular portion 112 to pivot the shift shaft 104 and shift the gears, as is well known in the art.

Figure 3:
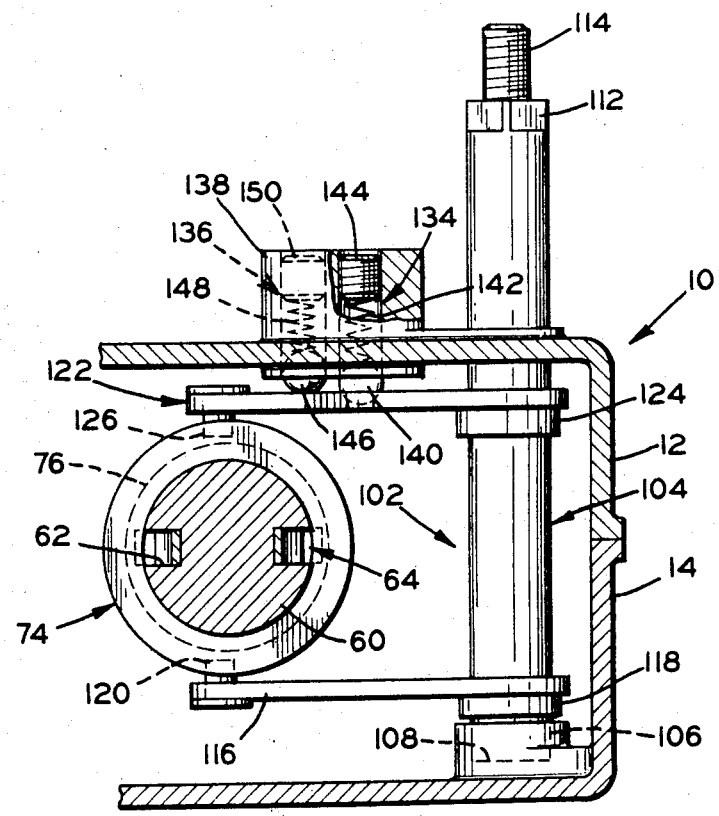
FIG. 3 is a view in vertical cross section, taken along the line 3—3 of FIG. 2.

The shifter fork 102 has a lower arm 116 which is affixed to a lower portion of the shift shaft 104 by a cylindrical flange 118. The fork arm 116 has an upwardly-extending projection 120 at an outer end portion thereof which is received in the outer annular groove 76 of the collar 74 (FIG. 3). An upper arm or detent plate 122 has a cylindrical flange 124 affixed to an intermediate portion of the shaft 104 below the top of the upper housing part 12. The detent plate 122 has a downwardly-extending projection 126 at an outer end portion thereof, with this projection being aligned with the projection 120 of the arm 116. The projection 126 also engages a portion of the outer annular groove 76 of the shift collar 74 diametrically opposite the portion engaged by the projection 120.

Figure 4:
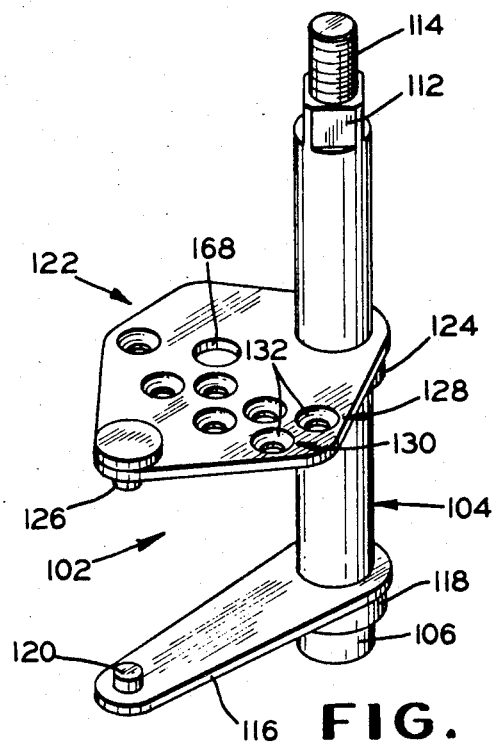
FIG. 4 is a view in perspective of a shifter fork.
Figure 5:
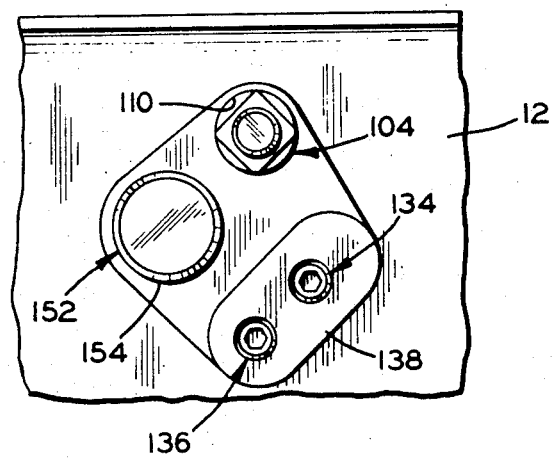
FIG. 5 is a fragmentary top view of a portion of the upper housing part of the transaxle.

As shown best in FIGS. 2 and 4, the detent plate has two arcuate rows 128 and 130 of detent recesses 132, with the rows having different radii but with a common center on the axis of the shift shaft 104. Referring particularly to FIGS. 3 and 5, two detent assemblies 134 and 136 are mounted in the top of the upper housing part 12, being located in an enlargement 138 of the housing. The detent assembly 134 includes a detent ball 140 urged downwardly by a spring 142 which is retained by a setscrew 144. Similarly the detent assembly 136 includes a detent ball 146, a spring 148, and a setscrew 150. The staggered relation of the detent recesses 132 in the arcuate rows 128 and 130 enables the transaxle to be shifted through the five forward speed gears, neutral, and the reverse gear with a relatively short arcuate movement of the shifter fork 102.

Referring to FIG. 2, the detent ball 140 of the detent assembly 134 engages the right detent recesses 132 in the inner row 128 when the shift mechanism is in neutral and the lug 68 of the shift key 64 is under the collar 46. At this time, the ball 146 of the detent assembly 136 engages the upper surface of the detent plate 122 between two of the detent recesses 132 in the outer row 130. When the shifter fork 102 is pivoted to shift gears, the ball 140 engages the middle recess of the row 128 when the transaxle is in the second forward speed and engages the left detent recess in the row 128 when the transaxle is in the fourth forward speed. The detent ball 146 engages the far right detent recess 132 in the row 130 when the transaxle is in reverse. The ball 146 then engages the next three recesses in the row 130 as the transaxle is shifted into the first, third, and fifth forward speed positions. The two detent balls 140 and 146 never engage two of the detent recesses 132 at the same time.

Figure 6:
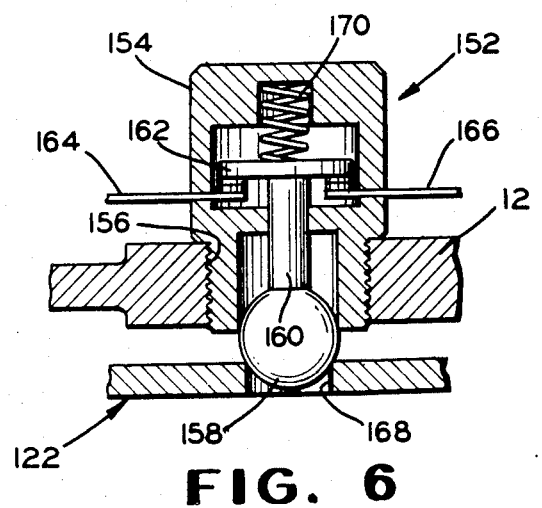
FIG. 6 is a somewhat schematic view in vertical cross section of a neutral switch employed in the transaxle.

A neutral switch 150 (FIGS. 5 and 6) can also be used with the shifter fork 102 to enable the vehicle with which the transaxle is used to be started only when the transaxle is in a neutral position. The neutral switch can be of many suitable types. As shown, it includes a housing 154 which is threaded into an opening 156 in the upper housing part 12. The switch includes a sphere 158 connected by a stem 160 to a conductive plate 162 which connects conductors 164 and 166 when in a lower position, as shown in FIG. 6. The switch is in this condition when the sphere 158 extends into a large opening 168 in the detent plate 122 when the shifter fork 102 is in the neutral position, as shown in FIG. 2. Otherwise, the sphere 158 rides on the upper surface of the detent plate 122, forcing the conductive plate 162 upwardly against the force of a spring 170 to separate the plate 162 from the conductors 164 and 166, thus providing an open circuit which prevents starting of the vehicle engine. As shown, the neutral opening 168 is spaced inwardly from the two rows 128 and 130 of the detent recesses, but could also be spaced outwardly of these two arcuate rows, as long as it is not in the path of the detent balls 140 and 146.

From the above, it will be seen that the shifter fork 102 with the detent plate 122 also functioning as a shift arm requires minimum vertical space in the gear box, as shown in FIG. 3, especially since the shift collar 74 can be quite close to the top of the upper housing part 12. The shifter fork 102 according to the invention also eliminates the need for a second one of the shift arms 116, thus eliminating the cost of the arm and the flange 118.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In a gearbox having a housing, a gear shaft, a plurality of gears rotatably mounted on said shaft, a connecting member movable along said shaft for individually connecting said gears to said shaft for causing said gears to rotate individually with said shaft, and a collar positioned around said shaft and engageable with said connecting member, shifting means for moving said collar and said connecting member along said shaft, said shifting means comprising a shift shaft pivotally mounted in said housing transversely to said gear shaft, said shift shaft having a detent plate extending from said shift shaft on one side of said collar, said detent plate having engaging means on an end portion thereof for engaging a portion of said collar, said detent plate having a plurality of detent recesses formed therein spaced inwardly from said engaging means, said detent recesses being on the side of said detent plate opposite said engaging means.

2. Shifting means according to claim 1 characterized by said detent recesses being positioned in staggered relationship in two arcuate rows having a common center on the axis of said shift shaft.

3. Shifting means according to claim 2 characterized by two detent means carried by said housing with one of said detent means positioned to engage one of the rows of detent recesses and the other being positioned to engage the other row of detent recesses.

4. In a gearbox having a housing, a gear shaft, a plurality of gears rotatably mounted on said shaft for placing the gearbox in a plurality of forward speed conditions, a neutral spacing ring on said shaft at one end of said plurality of gears, and a reverse sprocket rotatably mounted on said shaft on the side of said spacing ring opposite said plurality of gears, a connecting member movable along said shaft for individually connecting said gears and said sprocket to said shaft to cause said gears and said sprocket to rotate individually with said shaft, and a collar positioned around said shaft and engagable with said connecting member, shifting means for moving said collar and said connecting member along said shaft, said shifting means including a shift shaft pivotally mounted in said housing transversely to said gear shaft, a detent plate, said detent plate being affixed to said shift shaft and extending on one side of said collar, said detent plate having engaging means for engaging a portion of said collar, said detent plate also having two arcuate rows of staggered detent recesses having a common center on the axis of said shift shaft, said recesses being on the side of said detent plate opposite said engaging means and spaced inwardly from said engaging means toward said shift shaft, and two detent means carried by said housing and positioned to engage the detent recesses.

5. Shifting means according to claim 4 characterized by said detent plate having an opening therein spaced inwardly from said detent recesses to receive a neutral switch when said shift means is in a neutral position and said connecting member is positioned on said gear shaft in line with said spacing ring.

6. In a gearbox having a housing, a gear shaft, a plurality of gears rotatably mounted on said shaft, a connecting member movable along said shaft for individually connecting said gears to said shaft for causing said gears to rotate individually with said shaft, said connecting member also having a neutral position in which none of said gears are connected to said shaft, moving means positioned on said shaft and engagable with said connecting member for moving said connecting member along said shaft when said moving means is moved along said shaft, and shifting means comprising a shifter fork for moving said moving means and said connecting member along said shaft, said shifter fork comprising a shift shaft pivotally mounted in said housing transversely to said gear shaft, said shifter fork having a detent plate affixed to said shift shaft and extending on one side of said moving means, said detent plate having a projection engaging a portion of said moving means, and said detent plate having a plurality of detent holes spaced from said projection and forming a plurality of detent recesses in said detent plate, said projection projecting from one side of said detent plate and said detent recesses being on the opposite side of said detent plate.

7. Shifting means according to claim 6 characterized by said detent plate having a neutral switch opening spaced inwardly from said detent recesses, and a neutral switch carried by said housing and having a sphere urged toward said detent plate.

* * * * *